Figure 1:
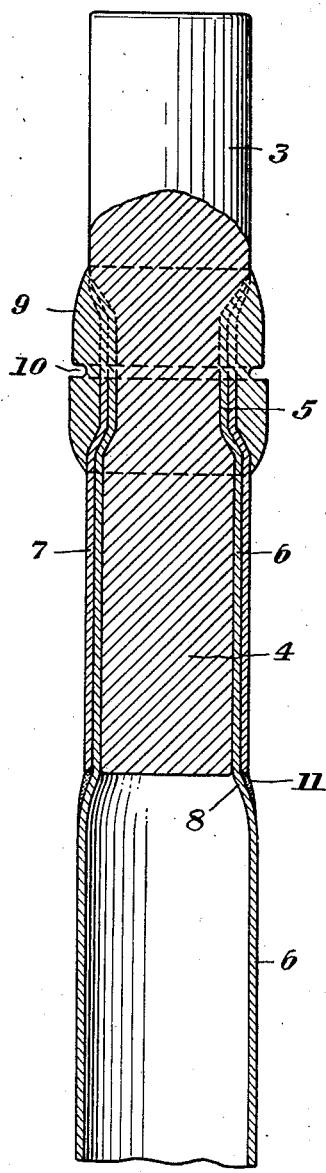

May 19, 1942.  C. C. HEETER  2,283,254
WELL TOOL
Filed Feb. 28, 1941

INVENTOR
Colonel C. Heeter
by his attys.
Stebbins and Blenko

Patented May 19, 1942

2,283,254

UNITED STATES PATENT OFFICE 2,283,254

WELL TOOL

Colonel C. Heeter, Butler, Pa., assignor to C. M. Heeter, Sons & Co., Inc., a corporation of Pennsylvania Application February 28, 1941, Serial No. 380,985

1 Claim. (Cl. 287—109)

This invention relates to a well tool, and more particularly it relates to fishing tools used for recovering drilling tools from deep wells. These fishing tools comprise a head or stem and a tubular socket which is forced down over the upper end of the tool to be recovered from the well. The stem and socket are welded together to form a substantially integral structure.

Such tools are disclosed in United States Letters Patent No. 959,341 and 1,051,225, granted to Charles M. Heeter. These patents disclose a fishing tool having a head or stem connected to a socket. The socket is swaged over the stem and a metal collar is fitted over the stem and socket. The stem, socket and collar are then welded together throughout a portion of the lengths of the stem and socket. While this method of construction produces a practically integral tool having considerable strength, it has been found that the heat necessary to weld the socket, stem and collar together weakens the socket below the weld. The cross section of the socket is relatively small and the heat from the welding decreases the tensile strength of the metal forming the socket below.

United States Letters Patent No. 1,822,400, issued to Joseph W. Heeter, discloses a construction of a tool of this type which is designed to overcome the harmful effects on the socket metal of the heat from the welding operation. This construction embodies a stem, a socket and a collar as in the prior patents. In addition a sleeve is fitted over the socket beneath the collar and covers that portion of the socket which is in contact with the stem and which is not welded. It was found that in making a well tool in accordance with the two earlier patents issued to Charles M. Heeter that the metal of the socket just below the portion of the socket which was welded with the stem tended to flow away from the stem. The protective sleeve prevents this flow.

However, fishing tools of this latter type are also subject to frequent breakage in use. In designing a fishing tool of this type the external diameter of the socket is made substantially equal to the diameter of the well in which it is to be used so that the socket will be certain to fit over the tool which is to be recovered from the bottom of the well. In order to make room for the protective sleeve it is, therefore, necessary to reduce the diameter of that portion of the socket which is in contact with the stem. This reduction is generally accomplished by a swaging operation and it has been found that the metal of the socket develops cracks at the place where the diameter of the socket decreases in size. The sockets are made of relatively thin metal, generally ⅛" thick, having a high carbon content to give the socket a large amount of resiliency. Therefore, it has not been possible to overcome the cracking developed when a portion of the socket is reduced in diameter by improvements in the swaging process. Consequently it has been found that well tools, constructed with the extra sleeve as disclosed in the Joseph W. Heeter Patent No. 1,822,400, frequently break just below the end of the stem when the socket is being driven over a tool at the bottom of a well.

It is the purpose of my invention to provide a well tool having a construction which overcomes the above described defects which have been found in well tools heretofore used. I provide a well tool in which the strengthening and protective features of an extra sleeve are utilized and the harmful effects of reducing the diameter of the socket are obviated.

Figure 2:
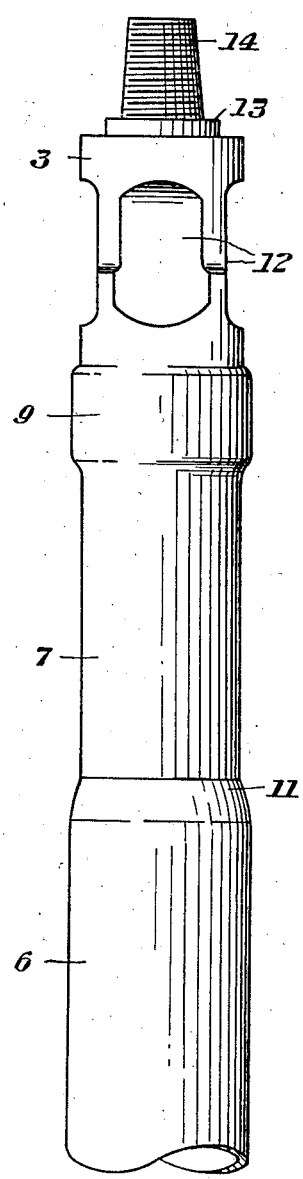

In the accompanying drawing I have described a present preferred embodiment of my invention in which;

Figure 1 is a partial vertical section of my well tool in the process of manufacture, and Figure 2 is a front elevation of a completed tool.

My well tool includes a stem having a head 3 and a lower end portion 4 having a diameter less than the diameter of the head. The inner end of the end portion 4 next to the head 3 is further reduced in diameter to form an annular recess 5.

A socket 6 of the usual construction is swaged at one end to reduce its diameter so as to fit closely around the lower end portion of the stem and within the annular recess 5.

A cylindrical sleeve 7 is then fitted over the socket along the length of the socket which is in contact with the stem 3 and is swaged to fit the portion of the socket which is in the annular recess 5. It should be noted that the sleeve extends from the head 3 to a shoulder 8 on the socket just below the lower end of the end portion 4 of the stem. This shoulder is formed by the reduction in diameter of the socket 6.

A collar 9, equal in height to the width of the annular recess 5, is swaged to fit closely around the socket and the sleeve within the annular recess 5. A groove 10 extends around the outer surface of the collar 9 in its mid-portion to assist in the subsequent welding operation and in the finishing of the tool.

After the various parts are assembled as above described, those portions of the stem, socket, sleeve and collar which lie above the groove 10, are heated to a very high temperature and subjected to a forging operation so that they become substantially one integral structure. The outer end of the sleeve 7 is also welded to the shoulder 8 of the socket 6 preferably by an acetylene weld 11. This latter welding operation fills with metal any cracks which have developed in the shoulder 8 when the diameter of the socket was reduced, and enables the sleeve 7 to absorb some of the shocks sustained by the socket 6 when the tool is being hammered over a drilling tool in the bottom of a well.

After the welding operations above described, the tool is turned down to its desired finished shape which may be as shown in Figure 2 of the drawing. The head 3 is forged to form wrench flats 12 and a connecting pin 13 having threads 14.

A well tool constructed in accordance with my invention is especially strong and durable. After the forging operations described above, the stem and socket are practically an integral structure. The socket is protected by a sleeve so that heat from the welding operation does not affect its tensile strength. The sleeve strengthens the portion of the socket which is just below the end of the stem and thus prevents breakage which has frequently occurred at that point in the well tools heretofore made.

While I have described only a present preferred embodiment of my invention it is to be distinctly understood that it may otherwise be variously embodied within the scope of the following claim:

I claim:

A well tool comprising a stem having an end portion of reduced diameter, said reduced end portion having an annular recess at the upper end thereof, a socket extending below the reduced end portion of the stem and having an upper end portion of reduced diameter to snugly fit the reduced end portion of the stem, including the annular recess therein, throughout the length thereof, a sleeve closely fitting over the reduced upper end portion of the socket throughout the length thereof, and a collar fitting closely over that portion of the sleeve within said recess, the stem, socket, sleeve and collar being welded together at the upper end of the reduced end of the stem and the sleeve being welded to the socket at the other end of the sleeve.

COLONEL C. HEETER.